W. D. OSBORN.
EXPRESS WAGON.
No. 60,234. Patented Dec. 4, 1866.
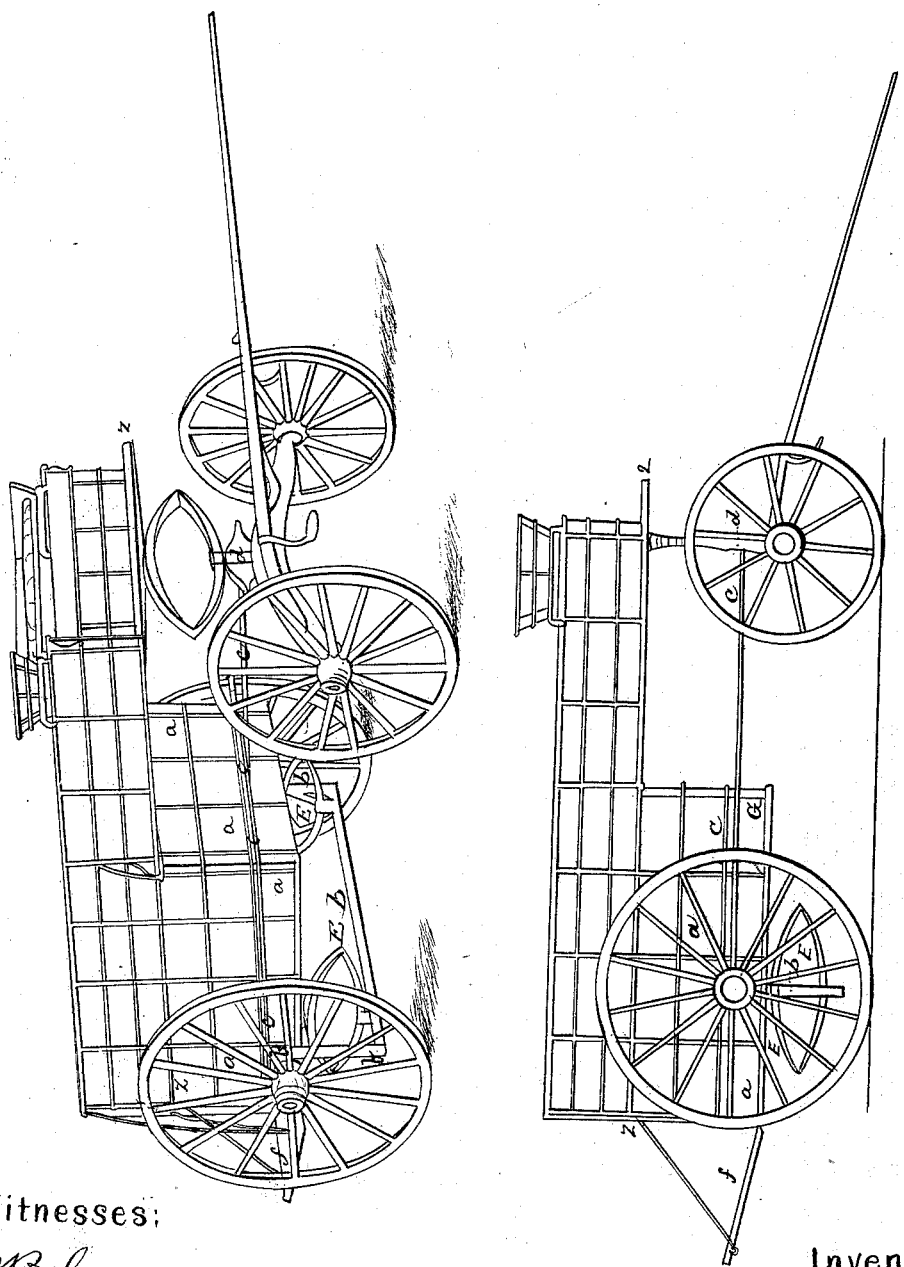
Witnesses:
Inventor:

United States Patent Office.

IMPROVEMENT IN EXPRESS WAGONS.

W. D. OSBORN, OF BOSTON, MASSACHUSETTS.

Letters Patent No. 60,234, dated December 4, 1866.

SPECIFICATION.

TO ALL WHOM IT MAY CONCERN:

Be it known that I, W. D. OSBORN, of Boston, in the county of Suffolk, and State of Massachusetts, have invented certain new and useful improvements in Jobbing or Express Wagons; and I do hereby declare that the following, taken in connection with the drawings which accompany and form part of this specification, is a description of my invention sufficient to enable those skilled in the art to practise it.

This invention relates to certain new and useful improvements in the construction of wagons for express or jobbing purposes, the object of the invention being to increase the carrying capacity of such wagons, with but little addition of weight thereunto, while the general convenience ensuing in handling and transporting heavy goods is greatly increased without detracting from any of the advantages possessed by the ordinary forms of wagons with high-set shallow bodies.

My invention consists in the extension of the rear or hind part of an ordinary express or job wagon body downward and below the bottom of the front part, so that the depth of the rear of the wagon is about double (more or less) the depth of the front, the hinder axle being sufficiently bent to receive the downward extension of the rear of the body upheld thereby. And my invention further consists in the combination, with such a wagon body and bent hind axle, of rear springs and a perch connecting the bolster with the hinder axle when this is forked at the rear to pass around the sides of the downward extended rear part of the body, and to fasten upon the rear axle near the hubs of its wheels.

The drawings show a job or express wagon embodying my invention, the wagon being shown in side elevation and in linear perspective. The bottom of the ordinary job wagon terminates in the plane of the line z z, below which, extending from about the centre of the length of the wagon body to the rear thereof, is the downward extension, a, of my improvement, adding more than one-third to the cubic capacity of the wagon body, with very little addition to the weight thereof. The bent hinder axle is marked b, the forked perch c, the bolster d, and the rear springs on the axle and under the rear extension of the body, e. To load into this wagon barrels and heavy boxes and bales of goods, it will be seen that very little lifting has to be done, especially in cities, as the bottom of the part a will come but little higher than the level of the tops of the street edge stones and sidewalks. The tail-board f makes, when lowered for the purpose of loading goods, a very convenient inclined plane to roll or slide the goods upon into the wagon, and when secured horizontally extends the bottom of the wagon to an amount often very useful. It is designed to have the upper edge of the tail-board, when vertical, in the plane of the line z z, so that when long articles like boards are to be carried, they may rest upon said edge. This wagon combines all the advantages of both high and low-hung bodies, as the driver's seat is elevated, enabling him to see his way clearly in crowded streets, and giving him full command of his team, while the swinging of the front wheels under the body allows the wagon to be turned in any direction within very small compass.

I am aware that a box body having a leaf or platform extending forward from its upper front edge has been supported on a bent hind axle and on a front axle, so that the forward wheels could turn under the platform without interfering with the box body. Such a construction I do not claim, and it differs from mine in that the front platform does not serve the purpose of a wagon body for holding loose articles, such as potatoes for example, but serves merely as a means for supporting the wagon body at such a distance from the front wheels as will enable them to turn without contact with the body, and also as a stand for the driver.

I claim a wagon made with the rear part of its body offset and depending downward below the bottom of the front part thereof, when combined with a bent hinder axle placed directly under the rear part of the body, and when the sides and front end of the body rise above the bottom of that part, all substantially as and for the purpose specified.

Also the combination, with such a wagon body and bent hind axle located as described, of springs e, and bifurcated perch c, as specified.

W. D. OSBORN.

Witnesses:
   J. B. CROSBY,
   S. B. KIDDER.